United States Patent [19]

Sharkey

[11] 4,156,452

[45] May 29, 1979

[54] FURNACES

[75] Inventor: Laurence M. Sharkey, Sutton Coldfield, England

[73] Assignee: Sharkey Metals Limited, Birmingham, England

[21] Appl. No.: 848,199

[22] Filed: Nov. 3, 1977

[51] Int. Cl.² ............................................. B22D 1/00
[52] U.S. Cl. ....................................... 164/266; 75/63; 164/335; 266/205
[58] Field of Search ................. 164/344, 266, 335; 266/200, 205, 211, 227, 236, 240, 242, 287; 75/63, 64

[56] References Cited

U.S. PATENT DOCUMENTS

| 831,123 | 9/1906 | Wagner et al. | 266/227 |
|---|---|---|---|
| 1,156,446 | 10/1915 | Taylor et al. | 164/344 |
| 3,601,179 | 8/1971 | Taylor | 266/240 |
| 4,074,749 | 2/1978 | Otani | 164/344 |

FOREIGN PATENT DOCUMENTS

| 705706 | 3/1941 | Fed. Rep. of Germany | 266/200 |
|---|---|---|---|
| 45-20563 | 7/1970 | Japan | 266/205 |
| 273457 | 7/1927 | United Kingdom | 266/242 |

*Primary Examiner*—Gerald A. Dost
*Attorney, Agent, or Firm*—Parmelee, Miller, Welsh & Kratz

[57] ABSTRACT

A metal melting furnace comprising a furnace housing, which includes a means for heating the interior thereof, and a hearth for holding metal to be melted wherein the hearth and the furnace housing are mounted for mutual relative movement between a position wherein the hearth is within the furnace housing where the metal can be melted and a position wherein the hearth is outside the furnace housing where metal can be loaded onto and unloaded from the hearth.

1 Claim, 4 Drawing Figures

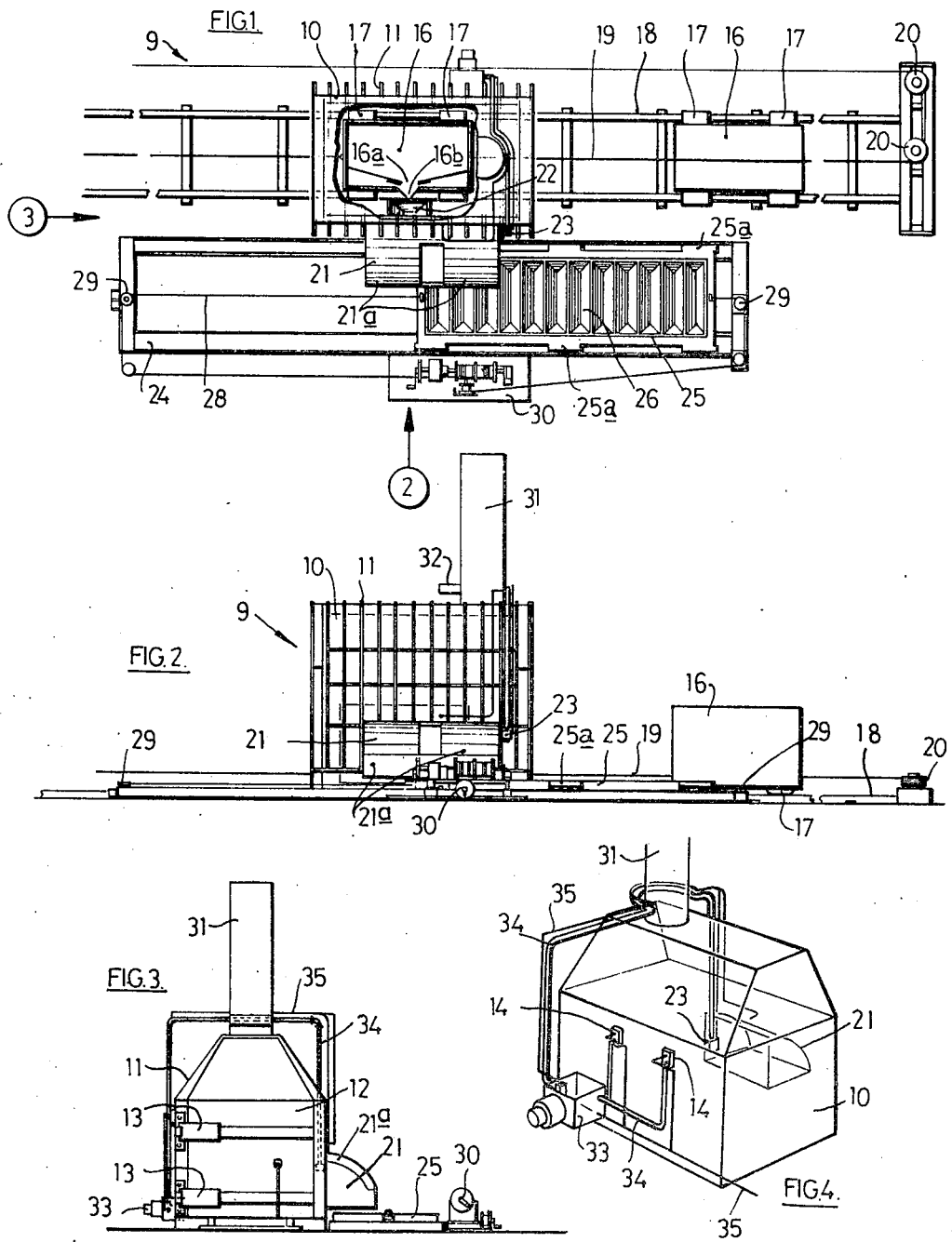

FURNACES

BACKGROUND OF THE INVENTION

The present invention relates to metal melting furnaces and particularly to furnaces for extracting aluminium from scrap metal comprising iron and aluminium.

Presently known furnaces for extracting aluminium from scrap metal comprise a furnace housing in which is fixedly mounted a hearth for receiving the scrap metal.

In order to extract aluminium from scrap metal in such a furnace, the scrap metal is loaded into the hearth inside the furnace so as to melt the aluminium which is usually collected as it melts and then, after the aluminium has been extracted the remaining scrap metal is removed from the hearth by raking it out through the furnace door by hand.

Such a furance thus suffers from the disadvantage that a considerable amount of labour is needed to remove the scrap metal after extraction of the aluminium has taken place.

SUMMARY OF THE INVENTION

It is accordingly an object of the present invention to provide a new or improved furnace whereby the above mentioned disadvantage is overcome or substantially reduced.

According to one aspect of the present invention there is provided a metal melting furnace comprising a furnace housing, which includes a means for heating the interior thereof, and a hearth for holding metal to be melted wherein the hearth and the furnace housings are mounted for mutual relative movement between a position wherein the hearth is within the furnace housing where the metal can be melted and a position wherein the hearth is outside the furnace housing where metal can be loaded onto and unloaded from the hearth.

The hearth may include an outlet for molten metal.

The furnace may include a holding pot for receiving the molten metal from the hearth.

The hearth may be provided with means which engage a track, the track extending from a position outside the furnace housing into the inside thereof.

The track may extend from said position outside the furnace housing through the furnace housing and to a second position outside the furnace housing and two hearths may be provided, each hearth having means which engage the track, and the arrangement being such that one of the hearths may be positioned inside the furnace housing whilst the other hearth is positioned outside.

The furnace may have associated therewith a track positioned beside the furnace housing and having mounted thereon a carriage containing ingot moulds for receiving the molten metal from the hearth.

The furnace may have associated therewith an ingot carriage having a number of pivotally mounted ingot moulds.

According to another aspect of the present invention there is provided a method for melting metal comprising loading metal into a hearth as yet not positioned in a furnace housing causes relative movement between the hearth and the housing to locate the hearth inside the housing, melting the metal whilst the hearth is within the housing withdrawing molten metal from the hearth causing further relative movement between the hearth and the housing to locate the hearth outside the furnace housing and finally removing any unmelted metal which remains in the hearth from the hearth.

The molten metal may be caused to flow from the hearth to a holding pot, then retained in the holding pot, then cast into ingot moulds.

The metal may comprise at least two different metals, one of the metals having a lower melting point than the other.

BRIEF DESCRIPTION OF THE DRAWINGS

The present invention will now be described in more detail with reference to the accompanying drawings wherein:

FIG. 1 is a plan view of a furnace embodying the present invention with part of the roof of the furnace broken away to show the interior thereof, FIG. 2 is an elevational view of the furnace of FIG. 1, viewed in the direction of the arrow 2, FIG. 3 is an end view of the furnace of FIG. 1, viewed in the direction of the arrow 3, and FIG. 4 is a perspective sketch of the furnace of FIG. 1 showing the arrangement of air lines, fuel burners and blower.

DESCRIPTION OF THE PREFERRED EMBODIMENT

Referring now to the drawings, the furnace 9 there shown comprises a furnace housing 10 having ribs 11 and at each end thereof doors 12 mounted pivotally on hinges 13. The doors, may of course, be mounted in any other desired way, for example, they may slide upwardly or laterally.

The housing 10 is generally hollow and includes a heating means comprising oil burners 14 to provide sufficient heat for melting metal, for example, aluminium contained in scrap iron or steel.

The furnace 9 is also provided with two hearths 16. Each hearth 16 has formed on the top thereof a concave portion, approximately of complementary shape to that of an inverted dome, thereby forming a floor to receive the metal to be melted, the floor being formed from a suitable refractory material. A portion 16a of the floor of each hearth 16 slopes downwardly from the centre of the hearth to an outlet 16b so that molten metal may flow out of the hearth 16.

Each of the hearths 16 is provided with slides 17, which engage a track 18 which, as may be seen, extends from a position on one side of the furnace housing 10 through the housing 10 to a position on the other side.

The two hearths 16 are connected to a cable 19 which passes over pulleys 20 to a winch, not shown. The hearths 16 may thus be alternately positioned inside the furnace housing 10 by operation of the winch.

The furnace housing 10 is provided with a holding pot 21 having two hinged lids 21a and a pouring hole, not shown. The holding pot 21 receives molten metal from the outlets 16b of the hearths 16 through a trough 22. The holding pot 21 is provided with an oil burner 23 to maintain the metal therein molten.

Mounted beside the furnace housing 10 is another track 24 having mounted thereon a carriage 25 having wheels 25a. The carriage 25 contains a number of ingot moulds 26. Each of the ingot moulds 26 is pivotally mounted about an axis extending transversely of the carriage 25 and is normally retained in an upwardly facing position. However, when required the ingot moulds 26 may be released from their upwardly facing positions to discharge the ingots formed therein.

The carriage 25 has a wire 28 attached at each end which passes over pulleys 29 and is driven by a manually operated winch 30 in order to move the carriage so that during casting of molten metal from the pouring hole of the holding pot 21 each of the ingot moulds 26 may be successfully brought below the pouring hole.

Also associated with the furnace is an electromagnetic crane, not shown, which is used to load scrap metal into the hearths 16 prior to a melting process and, after a melting process, to remove the ferrous metal which remains unmelted in the hearths 16.

The furnace 9 is also provided with a chimney 31 having a damper 32. The furnace 9 may also be provided with an after burner to reduce pollution.

The furnace 9 also has a blower 33 which supplies air to burners 14 and 23 through lines 34 and the burners 14 and 23 are supplied with fuel through lines 35.

The operation of the furnace 9 will now be described as it would be used for extracting aluminium from scrap metal comprising ferrous metals and aluminium.

Initially, the scrap metal is loaded by the electro-magnetic crane into one of the hearths 16, this hearth 16 being at the time positioned outside the furnace housing 10 but with the other hearth 16 positioned inside the furnace housing 10.

The hearth thus loaded with scrap metal is then moved into the furnace housing 10, simultaneously moving the other hearth 16 out of the furnace housing 10, to heat the scrap metal to a sufficiently high temperature for the aluminium to melt but not so high that the iron melts and the molten aluminium is collected by the hearth 16 and delivered to the holding pot 21. During melting of the aluminium, the other hearth 16 is loaded with a fresh batch of scrap metal.

Once the extraction of metal from the initial batch of scrap metal has been completed, the hearth 16 within the furnace is removed from the furnace housing 10, thereby positioning the other hearth 16 in the furnace housing for extraction of aluminium from a fresh batch of scrap metal and the remaining scrap metal from the first hearth 16 is removed by the electro-magnetic crane.

When sufficient aluminium has collected in the holding pot 21 the ingot moulds 26 are positioned successively in communication with the pouring hole and the hole is unblocked and the aluminium cast into the ingot moulds.

As may be appreciated, with a furnace according to the present invention the scrap metal may be removed from the hearth after the aluminium has been extracted using a minimum amount of labour as there is no need to rake or shovel the scrap metal out of the hearth through the door of the furnace.

In another embodiment of the invention, not shown, the hearths 16 remain stationary whilst the furnace housing 10 is moved alternately into heating relationship with each hearth so that the hearth not being heated within the furnace may be loaded and unloaded.

If desired in both embodiments only a single hearth may be provided but two are preferred as a greater rate of through-put can be achieved.

I claim:

1. A metal melting furnace comprising a furnace housing defining a single heating chamber, means for heating said chamber, a first track extending rectilinearly from a first position outside the furnace housing through the furnace housing to a second position on the opposite side of the furnace housing to said first position, two hearths for holding metal to be melted and providing a receptacle for molten metal, means mounting each hearth on said track for movement therealong, drive means to move said hearths along the track to sequentially position one hearth inside the furnace housing while the other hearth is positioned outside the furnace housing and then said other hearth in the furnace housing while said one hearth is positioned outside the furnace housing, an outlet for molten metal provided in each hearth, a holding pot having a pouring spout for receiving molten metal from said outlet when a hearth is positioned within the furnace housing, a second track positioned outside the furnace housing extending parallel to the said first track and having mounted thereon a carriage containing a plurality of pivotally mounted ingot moulds for receiving molten metal from said housing pot and means to move said carriage past the pouring spout of said holding pot to permit each mould to be filled sequentially.

* * * * *